(12) United States Patent
Celik et al.

(10) Patent No.: US 8,268,043 B2
(45) Date of Patent: Sep. 18, 2012

(54) MODULAR COMPACT ADSORPTION BED

(75) Inventors: Cem E. Celik, Grand Island, NY (US); Mark William Ackley, East Aurora, NY (US); James Smolarek, Boston, NY (US)

(73) Assignee: Praxair Technology, Inc., Danbury, CT (US)

( * ) Notice: Subject to any disclaimer, the term of this patent is extended or adjusted under 35 U.S.C. 154(b) by 326 days.

(21) Appl. No.: 12/646,157

(22) Filed: Dec. 23, 2009

(65) Prior Publication Data
US 2011/0146487 A1  Jun. 23, 2011

(51) Int. Cl.
*B01D 53/02* (2006.01)
(52) U.S. Cl. .............................................. 95/96; 96/130
(58) Field of Classification Search ......... 95/96; 96/130
See application file for complete search history.

(56) References Cited

U.S. PATENT DOCUMENTS

| | | | |
|---|---|---|---|
| 711,187 | A | 10/1902 | Stone |
| 2,055,774 | A | 9/1936 | Ray |
| 2,080,578 | A | 5/1937 | Ray |
| 3,186,149 | A | 6/1965 | Ayers |
| 3,590,561 | A | 7/1971 | Marble |
| 3,873,287 | A | 3/1975 | Barnebey |
| 4,969,936 | A | 11/1990 | Schweigert et al. |
| 5,290,345 | A | 3/1994 | Osendorf et al. |
| 5,324,159 | A | 6/1994 | Nowobilski et al. |
| 6,436,175 | B1 | 8/2002 | Coates et al. |
| 6,533,847 | B2 | 3/2003 | Seguin et al. |
| 6,802,889 | B2 | 10/2004 | Graham et al. |
| 6,916,360 | B2 | 7/2005 | Seguin et al. |
| 7,122,073 | B1 | 10/2006 | Notaro et al. |
| 7,879,138 | B2 | 2/2011 | Lee et al. |

FOREIGN PATENT DOCUMENTS

GB             606867 A       8/1948

OTHER PUBLICATIONS

Ergun, S. "Fluid Flow Through Packed Columns" *Chemical Engineering Progress.* vol. 48, No. 2 (1952) pp. 89-94.
Gross et al. "An Instrument for Determining the Volume and Bulk Density of Granular Materials". *ASTM Bulletin*, (1948) pp. 55-59.
Pushnov, A.S., "Calculation of Average Bed Porosity", *Chemical and Petroleum Engineering*, vol. 42, Nos. 1-2, pp. 14-17 (2006).

*Primary Examiner* — Robert A Hopkins
(74) *Attorney, Agent, or Firm* — Salvatore P. Pace (57) ABSTRACT

A modular and compact adsorbent bed structure is disclosed for use in an adsorption-based gas separation plant. The conventional adsorbent bed in a gas separation plant is replaced with a plurality of modular adsorbent bed units connected to make the adsorbent bed structure. Modular adsorbent bed units of this invention provide higher capacity of product per unit volume of adsorbent material (i.e., increased adsorbent utilization) as compared to that obtained from conventional adsorbent beds. The modular design requires lower fabrication costs; is easier to transport; has less maintenance and repair requirements; and is easier to load with adsorbent material.

24 Claims, 5 Drawing Sheets

MODULAR COMPACT ADSORPTION BED

FIELD OF THE INVENTION

The present invention relates generally to the field of adsorption beds, particularly adsorption beds for use in gas separation processes. More specifically, this invention relates to modular compact adsorbent bed units which can be combined to provide full sized adsorbent bed structures used in adsorption-based gas separation processes.

BACKGROUND OF THE INVENTION

Gas separation processes using adsorbent beds are well known in the art. Typical adsorption-based processes include those where a gas component within a multi-component feed gas is selectively adsorbed. Of particular interest are cyclic processes wherein the adsorbed gas is removed from the adsorbent material in a reversing gas flow such as pressure swing adsorption (PSA), vacuum swing adsorption (VSA) and vacuum pressure swing adsorption (VPSA) processes. These processes have evolved significantly over the last few years with improvements being made to the adsorbent materials, the adsorbent beds, and the overall process parameters and controls. Costs for the construction and operation of such plants are constantly being driven lower by competitive market pressures and it has become paramount to reduce the costs associated with designing, building, transporting and operating such plants by decreasing bed sizes and standardizing components. Modular and compact adsorbent bed structures are desirable to reduce the adsorbent material inventory; the size of the plant equipment, such as process vessels and surge tanks, and the overall plant footprint including the skid dimensions. Smaller skids reduce transportation and installation costs.

However, it is generally difficult to reduce the size of adsorbent bed structures without also significantly reducing the plant throughput. Modifications in the bed geometry and process parameters bring additional challenges, such as in proper design of bed or vessel shapes, proper distribution of gas flow, management of void volumes, adsorbent loading and containment constraints, and operation of the plant components at faster rates. Shallow beds (those having decreased bed depth) operate at faster cycles.

It is therefore desirable to design new adsorbent bed systems for use in adsorption-based gas separation processes that is modular and smaller in size; require lower fabrication costs; are easier to transport; have less maintenance and repair requirements; and are easier to load with adsorbent material. It is equally important to design adsorbent bed systems that, while being smaller or at least having smaller foot prints, do not negatively affect the process flow, cycle speed, rate and volume of throughput, and overall power requirements of the process.

U.S. Pat. No. 6,533,847 discloses an adsorption bed arrangement to remove airborne contaminants with a plurality of V-shaped adsorption elements having two layers of adsorbents, a housing, and a gasket member.

U.S. Pat. No. 6,802,889 discloses a rapid cycle PSA system, process and apparatus designed for low void volumes, relatively short bed lengths and fast cycles, and use finer adsorbent particles. This unit has small product throughputs and an aspect ratio ($L^3/V$ bed) of less than 10, where L is the bed depth and $V_{bed}$ is the bed volume.

U.S. Pat. No. 7,122,073 discloses a low void pressure swing adsorption system comprised of at least one hermetically sealed vessel containing an adsorbent. The void volume of the inlet and outlet are limited to less than 20% of the adsorbent bed volume.

U.S. Pat. No. 4,969,936 discloses a gas filtration system with a plenum having an inlet, an outlet, a top, and bottom and a V-shaped housing within the plenum chamber with a plurality of apertures for permitting the flow of gas. The filter system has a modular design for filtering large volumes of air.

U.S. Pat. No. 6,436,175 discloses a modular adsorption PSA or VPSA plant comprising one or more transportable cargo containers which hold the various adsorbent beds and pumping apparatus which comprise the plant. The plant is designed for small absolute pressure swings not exceeding 3 bar absolute and at close to ambient pressures (i.e. low pressures adsorption processes). This patent further teaches details of a rectangular vessel apparatus that confines a single adsorption bed.

None of the prior teachings describe the modular compact design of the present invention.

Significant capital cost savings can be achieved using a modular and/or compact adsorbent bed structure in an adsorption-based gas separation plant. For the purposes of the present invention, the term "modular" means reconfiguring a given frontal flow area of a conventional bed into smaller more manageable sections that fit into a housing wherein each bed unit or module is easier to load adsorbent material into, easier to handle and/or replace in the housing, and generally provide greater flexibility in design of the overall adsorption bed structure. Likewise, the term "compact" in the present invention refers to sections or units which provide intensification of the process by decreasing the adsorbent volume required for a given feed flow (by decreasing the bed depth) when cycling the process at a faster rate. In the present invention, a conventional packed bed in a gas separation plant is replaced with a plurality of modular adsorbent bed units. Individual modular adsorbent bed units, containing the adsorbent material, are combined to construct a fully sized adsorbent bed structure or vessel having the size and dimensions required for the particular plant requirements. When the modular adsorbent bed units are also made compact, then additional savings and design flexibility are possible due the reduced amount of adsorbent material required.

One benefit of the present invention, depending on the particular modular units employed, is that the total capacity of the adsorbent bed structure can be increased or decreased simply by including more or less modular adsorbent bed units, i.e. plants of different production capacity require the same general adsorbent bed structure but with the number of modular adsorbent bed units selected according to the feed and product flows desired. Such modular and/or compact beds also allows for greater flexibility in matching the adsorbent bed requirements to the specific adsorbent material efficiency and the output requirements of the particular plant.

The present adsorption bed structure also brings together the benefits of a modular compact design utilizing low inlet void volumes, large bed frontal areas, and short bed depths (transfer lengths). It brings together these factors into a modular and scalable adsorbent bed and vessel design, requiring decreased adsorbent inventory, smaller plant equipment and hence, smaller dimensions. The compact configuration also provides higher capacity of product per unit volume of adsorbent material (i.e., increased adsorbent utilization) as compared to that obtained from a conventional packed bed. The present invention may substantially reduce the pressure drop in the adsorbent bed by optionally providing a very large flow area (frontal area) combined with shorter bed depths facilitating faster cycles in the preferred cyclic processes.

BRIEF SUMMARY OF THE INVENTION

The present invention provides a novel modular compact design for adsorbent bed structures used in adsorption-based gas separation processes and is particularly suitable for cyclic processes such as pressure swing adsorption (PSA), vacuum swing adsorption (VSA) and vacuum pressure swing adsorption (VPSA) processes. The modular compact design consists of individual module adsorbent bed units which can be connected, stacked or otherwise coupled to form adsorbent bed structures of varying sizes and shapes. As mentioned above, significant capital cost savings can be achieved using the modular and compact adsorbent bed units in adsorption-based gas separation plants. The modular compact design results in smaller modular adsorbent bed units that enable easier adsorbent material loading compared to bulky conventional adsorbent beds. The modular compact design also facilitates increased bed frontal areas and shorter bed depths as desired.

According to this invention, a conventional packed adsorbent bed used in a gas separation plant is replaced with a modular compact adsorbent bed structure containing a plurality of modular adsorbent bed units. These modular adsorbent bed units provide higher capacity of gas product per unit volume of adsorbent material (i.e., increased adsorbent utilization) as compared to that obtained from a conventional packed adsorbent bed. They also provide substantially reduced pressure drop through the adsorbent bed structure through the use of shorter bed depths and optionally increased flow area.

The fully assembled adsorbent bed structure of this invention consists of a plurality of modular adsorbent bed units. The modular units fit into a suitable enclosure or housing to form the adsorbent bed structure. The present invention encompasses both the adsorbent bed structure comprised of a plurality of modular adsorbent bed units and the modular adsorbent bed unit alone.

In one embodiment, an adsorption bed structure is provided comprised of:

a) an enclosed housing with inlet means and outlet means, b) a plurality of modular compact adsorbent bed units within the housing, each of the units comprised of two substantially parallel opposing gas permeable faces enclosed within perimeter side walls connected to the faces and wherein the distance between the modular adsorbent bed units is equal to or less than half of the modular adsorbent bed unit depth, c) adsorbent material densely packed within the units and having an inter-particle void fraction of less than 40%, d) a feed channel adjacent to one face of each of the units;

e) a product channel adjacent to the opposing face of each of the units; and wherein a product gas flows into the housing through the inlet means through the adsorbent bed units and exits the adsorbent bed units through the product channel to the outlet means, and wherein the distance between the adsorbent bed units containing the feed channel and the product channels is equal to or less than half of the bed depth and the inlet void volume ratio of each of the adsorbent bed units is less than 30%.

In another embodiment, a cyclic adsorption-based gas separation process is provided for removing at least one absorbable gas component from a multi-component feed gas comprising passing the feed gas through an adsorbent bed structure comprising:

a) a plurality of modular compact adsorbent bed units, each modular unit having two opposing gas permeable faces enclosed within four non-permeable side walls around the perimeter of the faces, b) adsorbent material densely packed and retained within the faces and the side walls, c) feed channels proximate to one face of modular adsorbent bed unit and a product channel proximate to the opposing face of the same modular adsorbent bed unit, d) a housing having a feed inlet to receive feed gas, a feed manifold to distribute the feed gas to the product channel and a product manifold and a product outlet to receive the product gas from the product channel, and wherein the housing encloses the plurality of modular adsorbent units, the feed channel, the product channel, the inlet manifold and the product manifold and the total void volume ratio is less than 30%.

In yet another embodiment, the modular compact adsorbent bed unit is provided, such modular adsorbent bed unit capable of selectively adsorbing an absorbable gas component from a multi-component feed gas during a gas separation process comprising a substantially rectangular box shape having two opposing gas permeable faces enclosed within four non-permeable side walls around the perimeter of the faces and the side walls wherein the adsorbent material is densely packed within the adsorbent bed units with an inter-particle void fraction of less than 40%.

BRIEF DESCRIPTION OF THE DRAWINGS

For a more complete understanding of the present invention, reference should be made to the following Detailed Description taken in conjunction with the accompanying drawings in which.

DETAILED DESCRIPTION OF THE INVENTION

The present invention is directed to a modular compact adsorbent bed structure and process employing modular compact adsorbent bed units and used in gas separation processes included, but not limited to, PSA, VSA and VPSA cyclic processes. The term "modular adsorbent bed unit" or "modular unit" as used herein is the individual unit containing an adsorbent bed with adsorbent material and designed to be combined with one or more other adsorbent modular bed units. The term "adsorbent bed structure" as used herein is the fully assembled bed or vessel structure comprised of a plurality of individual modular adsorbent bed units. The adsorbent bed structure typically includes a housing member to hold the modular adsorbent bed units. The term "frontal area" as used herein is the surface area of one of the gas permeable side walls of the modular unit. The term "bed depth" as used herein is the depth of the adsorbent bed containing adsorbent material measured in the direction of gas flow across the bed. Bed depth is also sometimes referred to as bed transfer length or bed length in the art. The term "adsorbent material" as used herein means a granular adsorbent material in a physical form such as cylindrical pellets, spherical beads, crushed granules or any such agglomerate of the types commonly applied in adsorption processes such as synthetic or natural zeolite molecular sieves, activated carbon, activated alumina, silica gel, etc. The cycle time required for a "conventional" adsorption process depends upon the specific separation and adsorbent. The term "fast cycle" as used herein refers to cyclic adsorption process that have been intensified (shorter bed depth, faster cycle) relative to their conventional process configuration. For example, conventional two-bed adsorption air separation processes using $N_2$-selective zeolites producing 90% or greater $O_2$ purity product typically have a bed depth of 1.0 m or greater and operate with a total cycle time greater than 30 seconds (s). An intensified or fast cycle air separation process would then be one with a cycle time (adsorb/desorb) of less than 30 s and a bed depth reduced approximately in the same proportion as the decrease in cycle time, e.g. a 15 s cycle has a bed depth of 0.5 m.

Adsorption processes have been widely used for the separation or purification of gases. An example of a typical adsorption-based process, and the most preferred use of the present invention, is a cyclic, single bed VPSA process. During operation, a multi-component feed gas, such as air, is introduced to the feed side of the adsorbent bed structure, an absorbable component of the multi-component feed gas, such as nitrogen, is preferentially adsorbed by the adsorbent material in the bed, and a component depleted product gas, such as oxygen, is recovered. In the desorption part of the cycle, the gas flow is reversed to remove or desorb the adsorbed gas component from the adsorbent material in the bed. Desorption is typically carried out in conjunction with a reduction in pressure and/or an increase in temperature. The adsorption/desorption cycle is then repeated.

The modular compact adsorption-based bed and process of this invention uses an adsorption bed structure containing a plurality, at least two, modular adsorbent bed units. Each modular unit has an adsorbent bed contained within its side walls and the adsorbent bed has a short depth and a large frontal area to promote adsorption/desorption. This design geometry is referred to as a compact or shallow bed. Shallow beds allow for a shorter adsorption cycle to obtain maximum adsorbent utilization. Shallow beds use less adsorbent material per unit of product resulting in a lower pressure drop, smaller process vessel, smaller plant equipment, and smaller skid dimensions, all of which result in capital cost and transportation cost savings. Larger frontal areas permit lower flow velocities and therefore may be optionally applied to decrease pressure drop further through the modular units and the adsorbent bed structure translating into additional operational cost savings. Lower flow velocities through the bed also improve adsorption transfer rate.

The compact shallow bed design intensifies the adsorption/desorption process by operating at a faster cycle, resulting in increased adsorbent utilization (increased product per unit volume of adsorbent material) and reduced pressure drop across the adsorbent bed compared to that obtained from a conventional packed bed. It is also important to achieve even gas flow distribution in shallow beds to avoid maldistribution of gas flow by controlling flow channel design and by minimizing inlet void volume space, i.e. void space on the inlet side of the modular adsorbent bed unit. Good flow distribution across the inlet face of the modular adsorbent bed unit is achieved when the velocity distribution is uniform. Such a condition is influenced by the size and geometry of the inlet space, including the inlet void volume. Flow distribution can be predicted using computational fluid dynamics (CFD) techniques as is commonly known in the art.

Each modular unit is designed to incorporate the shallow bed design as more fully explained below. Based on the continuity equation, the flow velocity is proportional to the inverse of the flow area (frontal area) for a given or fixed mass flow, and the reduced velocity gained from increased frontal area translates directly into a reduction in pressure drop across the modular adsorbent bed unit. The energy loss due to pressure drop across the modular adsorbent bed unit is composed of viscous and kinetic terms, as evidenced in the well-known Ergun equation (S. Ergun, "Fluid Flow Through Packed Columns", *Chemical Engineering Progress*, Vol. 48, No. 2, pp. 89-94 (February 1952)). The viscous term is proportional to velocity while the kinetic term is proportional to the square of the velocity. Additionally, for a given adsorbent volume, an area increase results in a corresponding reduction in bed depth. Since pressure drop is directly proportional to bed depth, the combined effects of increased area and reduced bed depth are equivalent to a reduction in overall pressure drop that is roughly proportional to the square of the velocity reduction.

A conventional adsorbent bed with a certain bed depth (bed transfer length) D and bed frontal area A is compared to a shallow bed having same bed frontal area A, but with, as an example, a ten times shorter (0.1 D) bed depth. The shallow bed needs to operate an adsorption cycle that is approximately ten times faster than a conventional bed. Although it may be desirable to increase frontal flow area relative to a conventional bed, this is not always the case as it is often desirable to maintain an optimum flow through the bed to achieve maximum product capacity of the modular unit. However, shallow bed intensification always provides a decrease in pressure drop due to the reduction in bed depth.

Since compact shallow beds have a short depth and relatively large flow area, it is preferred that the adsorbent material be densely packed. It is important to maintain uniform and dense packing of the adsorbent material to achieve uniform flow through the bed and minimize channeling. Channeling of the flow at the walls can seriously degrade the performance of the adsorbent material and the system. As described in GB Pat. No. 606,867 and by W. E Gross et al., dense uniform packing of the adsorbent can be achieved using a gravity-assisted filling method, in which adsorbents are dropped from a certain height in perpendicular direction to the bed depth, passed through the series of wire screens, and filled into the enclosed bed volume (W. E. Gross, J. C. Goshorn, "An Instrument for Determining the Volume and Bulk Density of Granular Materials", *ASTM Bulletin*, pp. 55-59 (March 1948)). With this method it is possible to achieve a dense packing of adsorbent particles in the bed with an inter-particle void fraction of less than 40% and preferably of less than 37%. "Bed voidage" or bed void fraction ($\epsilon_B$) can be described as percentage of inter-particle void spaces formed during packing of granular materials as described by the following equation:

$$\varepsilon_B = 1 - \frac{\rho_B}{\rho_P}$$

$\rho_B$ is the packed bulk density of the adsorbent in the bed and is determined directly by measuring the amount of adsorbent and the bed volume into which it is packed. $\rho_p$ is the average particle density of the adsorbent as determined by mercury porosimetry or other appropriate method as is commonly known in the art. Inter-particle void spaces can be minimized to achieve dense packing by applying the appropriate loading method. As shown in U.S. Pat. No. 5,324,159, an adsorbent with particle density of 1.01 kg/m³ (63 lb/ft³) will result in packed bulk density of 0.673 kg/m³ (42 lb/ft³) with 33% voidage ($\epsilon_B$=0.33) if loaded densely, or packed bulk density of 0.609 kg/m³ (38 lb/ft³) with 40% voidage if loaded loosely. The modular units of this invention will have adsorbent material which has been densely packed so as to have an inter-particle void fraction of less than 40% and preferably of less than 37%.

Beds that are not densely packed or loaded are subject to gradual settling during operation. Such settling may result in non-uniform flow through the bed and even channeling or bypass of the adsorbent material in the worst case. The dense filling method minimizes or completely avoids these undesirable conditions. Some attrition of the adsorbent due to the repeated cycling of flow through the bed, could result in formation of additional voids and channels. These conditions can be avoided by constraining the adsorbent, e.g. using a combination of a solid pressure plate and spring under the top closure at the filling end of the modular unit. The pressure plate would move under the influence of the spring to compress the bed and close any bulk voids or gaps that might develop within the bed or along the wall of the module. The same effect can also be achieved by placing a pressurized bladder on top of the bed.

As previously mentioned, high inlet void volume ratios in adsorption processes, especially PSA, VSA and VPSA type systems, reduce the overall efficiency of the process. The "void volume ratio" is defined here as the ratio of the feed side or inlet void volume (e.g. feed pipe, feed manifold and feed channel) to adsorbent volume, which includes the inter-particle space within the adsorbent material. The void volume ratio is a measure of inefficiency of the system because the inlet void volume is filled with pressurized gas during feed step and later this gas is discarded during desorption, thus creating a penalty to power. The adverse effect of inlet void volume on the process increases with shorter cycle times and shallower beds. High void volume ratios also adversely affect process performance by reducing recovery and production capacity and increasing power consumption. The faster the cycle, the more adverse the impact of the void volume ratio is on the process performance. Thus, in fast cycle cyclic processes the void volume ratio becomes an important factor and small void volume ratios of less than 30% are preferred in the adsorbent bed structures.

Replacing a conventional packed bed with a plurality of shallow bed, adsorbent bed units tends to increase the void volumes associated with the same frontal area. As a result, shallow beds tend to have a greater ratio of inlet void volume to bed volume than conventional beds and thereby result in an increase in energy consumption and a decrease the efficiency of the adsorption plant unless measures are taken to counter this effect. Manifolds and flow channels must to be designed to be narrow, small in volume or otherwise limited in compact modular design. However, very small flow channels can adversely impact the efficiency by restricting flow and/or increasing pressure drop. The adsorbent bed structures of this invention reduce both inlet void volumes and pressure drop while maintaining good flow distribution. The adsorbent bed structures are designed with sufficient passageway and spacing between the modular adsorbent bed units to provide feed and product channels having adequate flow, but are not greater in width than the total bed depth. To minimize the inlet void volume spaces, the distance between the modular adsorbent bed units containing the feed and product channels is preferably equal to or less than half of the bed depth, and most preferably as small as practical. Where more space is needed to facilitate mounting the adsorbent bed units in the housing, feed inlet voids may be filled with inert material such as ceramic balls. Further, the present invention can be deployed in a manner in which the product manifold volume is preferably less than 25 percent of the feed manifold volume, most preferably less than 20 percent. This is beneficial in that less product is retained in the product manifold at the end of each production step.

Figure 1:
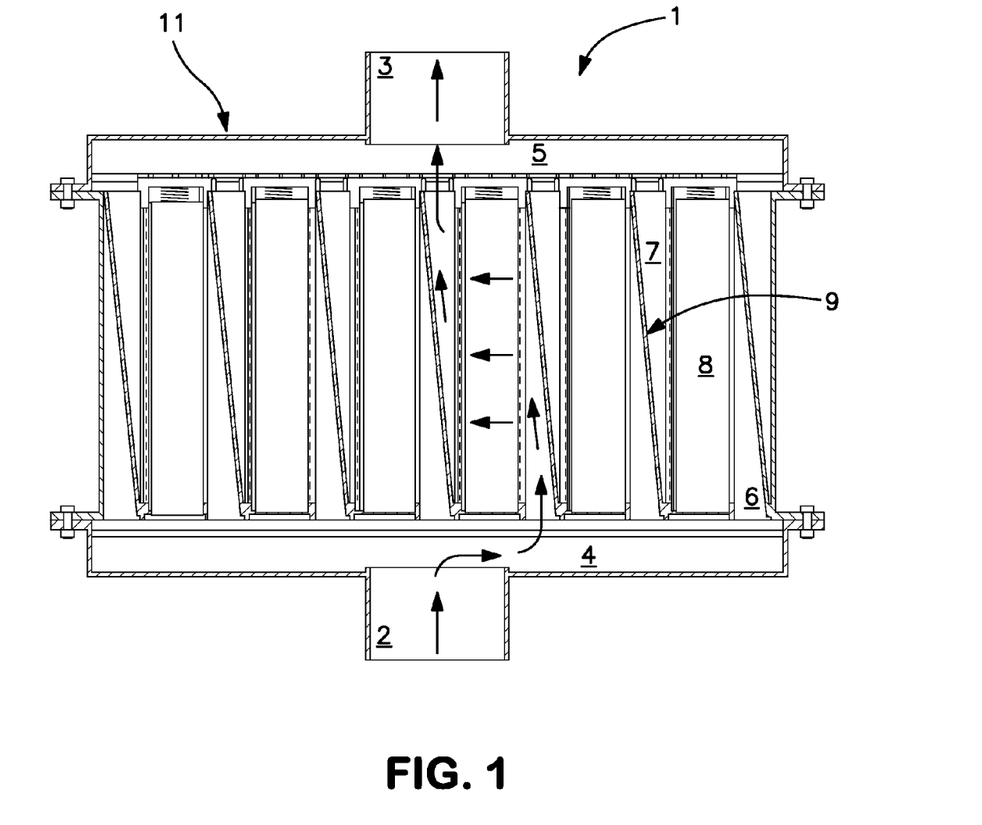
FIG. 1 is a schematic illustrating one modular compact adsorbent bed structure of the present invention.

FIG. 1 is one embodiment of this present invention showing an adsorbent bed structure (1) which includes a housing (11) comprised of six modular adsorbent bed units (8). Depending on the product throughput demand or other size requirements of the plant, an increased or decreased number of modular adsorbent bed units can be employed. The multi-component feed gas is introduced through feed inlet (2) and flows into feed manifold (4) where it is distributed uniformly to flow through multiple feed channels (6) and into the module units (8) in approximately equal volumes and pressures. The product gas, depleted of at least one adsorbed gas component, exits from each modular unit (8) through the product channels (7) and is combined with product gas exiting uniformly from other product channels; i.e. also in approximately equal volumes and pressures. Channel dividing wall (9) divides the full channel passageway between the modular units into two separation sides; feed channel (6) and product channel (7), so that the feed gas and product gas do not mix. Feed channel (6) receives the feed gas prior to adsorption and product channel (7) removes the component depleted product gas in which the more readily adsorbed gas component has been removed. The channels (6, 7) at their widest point are not greater in width than the total adsorbent bed depth within modular unit (8). As a general guideline, it is desirable to limit the distance between the modular adsorbent bed units (8) containing the feed channels (6) and the product channels (7) to one-half of the adsorbent bed depth or less. The final dimensions are determined to minimize feed inlet voids and to provide uniform flow distribution.

In this embodiment, there is one feed channel (6) and one product channel (7) for each adsorbent bed unit (8). The dividing walls shown on the outer ends of the adsorbent bed housing (11) are included only for manufacturing convenience and can be removed, or alternatively can be retained for expansion of the bed as more modules are added. Optionally, the end plates on the distal ends of the housing (11) can also be removed or the passageway narrowed (not shown) as necessary. The component depleted product gas exits the modular units (8) through the product channels (7) and is combined with other product gas in product manifold (5) to form the full product gas stream. The product gas stream exits the product manifold (5) through product outlet (3) and is recovered. Feed inlet (2) and product outlet (3) are connected to the necessary piping and valves in the adsorption plant for feed, product, and reflux flows to operate in a conventional adsorption process.

In the cyclic process, the directions of all gas flows are reversed for the desorption step. The flow arrows shown on FIG. 1 can be reversed to best understand the gas flow during the desorption step. During the desorption step, gas remaining in the void spaces of the vessel as well as gas adsorbed within the adsorbent is removed in a direction counter current (opposite) to the direction of the feed flow. Such a desorption step may be carried out at a pressure above or below atmosphere pressure, and with or without a positive purge gas. If a purge gas is used, it is supplied through the product outlet (3). As is well understood to one skilled in the art, the adsorption and desorption steps may be combined with other steps, e.g. pressurization, equalization, etc., in a complete cycle that is continuously repeated.

Although the present invention is described herein as being useful in fast cycle PSA, VSA or VPSA processes, this invention is applicable to any fixed bed adsorption-based gas separation process using an adsorbent material to separate or remove one or more gas components or to purify gases and wherein the retained gas or gases in the adsorbent material must be desorbed or otherwise removed. Although preferred, this invention is not limited to cyclic processes. Examples of suitable cyclic processes include oxygen VPSA systems; hydrogen PSA systems; PSA and thermal swing adsorption (TSA) air purification systems; $CO_2$ VPSA systems; nitrogen PSA systems; and ethanol dehydration systems. Other adsorbent based gas separations processes can include processes for the separation of gases such as hydrogen, argon and carbon dioxide and for the removal of water. Most preferred are VPSA air separation processes wherein the oxygen and nitrogen gases are separated.

Figure 2:
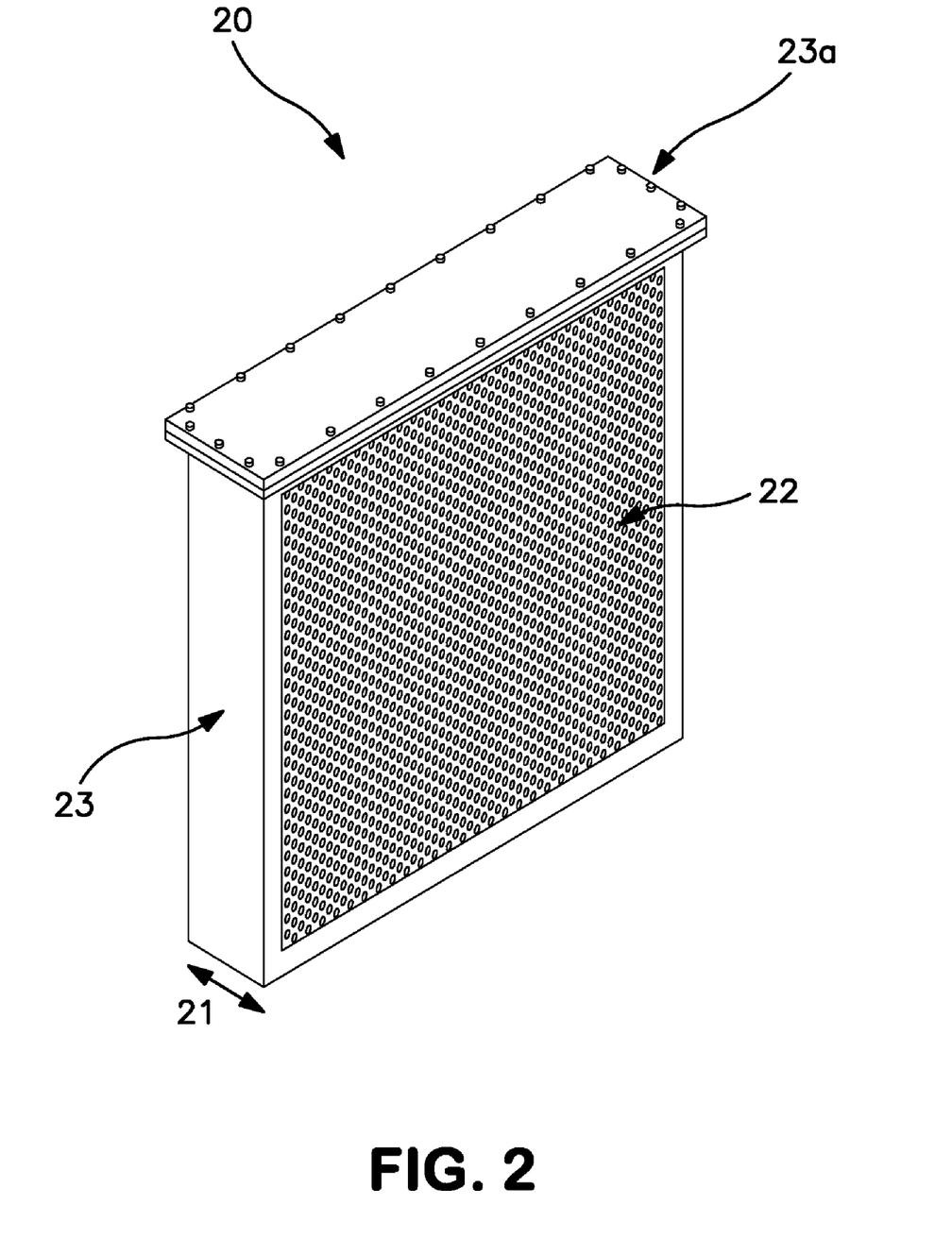
FIG. 2 is a schematic illustrating a generally rectangular modular adsorbent bed structure of the present invention.

FIG. 2 shows a modular adsorbent bed unit having a generally square design and shaped like a flat box with large frontal faces. Box-shaped modular adsorbent bed unit (20) has a short bed depth represented by arrow (21) and two opposing square frontal faces (22), although only one face is shown. Preferably, the frontal faces (22) will be in generally parallel configuration as understood. Each frontal face (22) is a gas permeable surface capable of permitting the axial flow of gas while retaining adsorbent material in a typical packed formation (not shown). The adsorbent material within the modular unit is also referred to as the adsorbent bed. Both opposing frontal faces (22) are enclosed within four perpendicularly positioned side walls of which only two are shown (23 and 23a). Optionally, one of the side walls (23a) can be designed to be larger to form a lip for sealing the modular unit within the housing or can include other means to seal the modular unit when inserted into the housing (not shown). The flat box-like shape of modular unit 20 provides for easy manufacturing, modularization, standardization and adsorbent loading, further decreasing costs.

Referring again to FIG. 2, the longest dimension of the bed within modular unit (20) is defined by one or both of the side walls (23) enclosing the frontal faces (22), while the shortest dimension of the modular unit is the depth of the adsorbent bed, corresponding to the width of side wall (23), shown as arrow (21). Although as shown, the modular unit (20) of this embodiment is a substantially rectangular box; a rectangular face of unequal width and length may also suffice. The arrow (21) represents the depth of the shallow adsorbent bed. The shortest side of the frontal faces (22) of modular units (20) should be at least twice the bed depth (21), preferably at least five times the bed depth and most preferably ten times or more the bed depth. Densely packed adsorbent material is confined within the modular unit (20) and this configuration illustrates the underlying concept of having large frontal areas and short bed depths (shallow bed) used to enhance the efficiency of the adsorption process.

The two parallel frontal faces (22) are typically constructed of perforated plates and wire mesh or cloth screens (not shown), although other means for retaining the adsorbent material can be employed. The side walls (23, 23a) are non-permeable and there is no gas flow into or from the modular adsorbent bed unit through the side walls (23, 23a). Gas flow only enters into or exits out of this confined adsorbent material through the opposing two frontal faces in a generally axial direction. In another preferred embodiment the surface area of frontal faces (22) is greater than the total area of all the side walls.

Figure 3A:
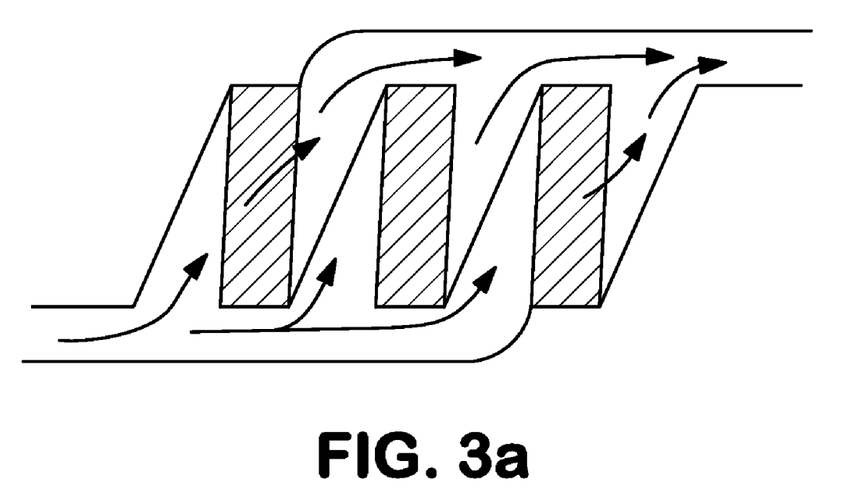
FIG. 3a is an illustration of the configuration of the modular compact adsorbent bed units as deployed in FIG. 1
Figure 3B:
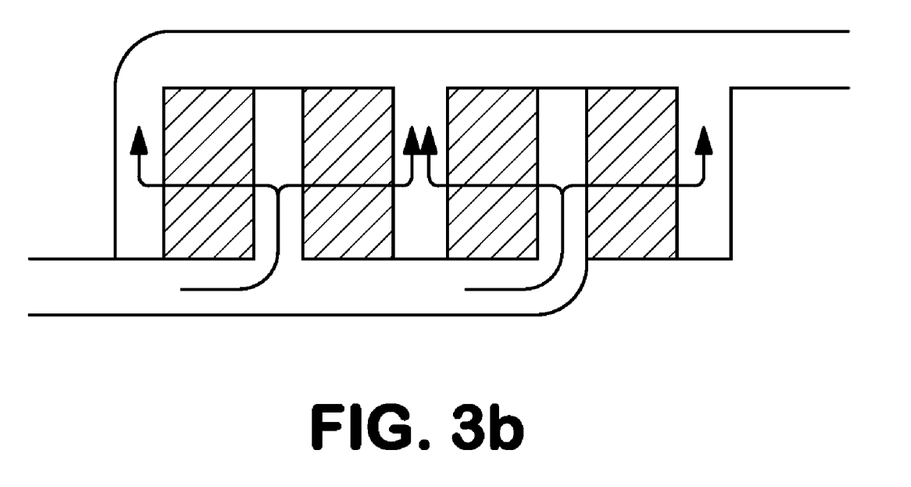
FIG. 3b is an illustration of an alternative configuration of the modular compact adsorbent bed units.
Figure 4:
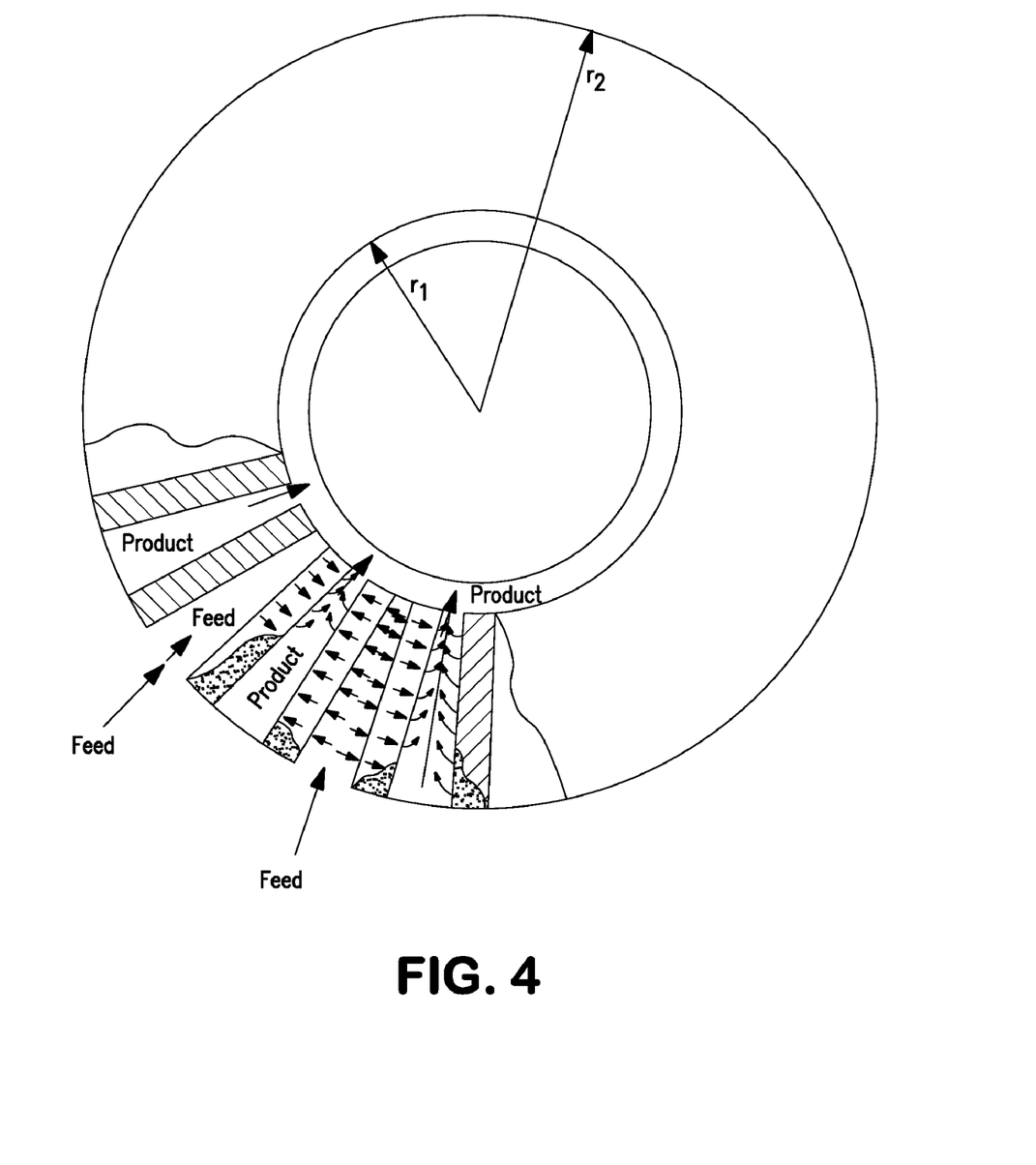
FIG. 4 is a top view of a radial housing for enclosing a plurality of modular compact adsorbent bed units using the configuration shown in FIG. 3(b)

Modular adsorption units similar to the one shown in FIG. 2 may be configured or paired to achieve two distinctly different inlet/outlet flow paths as illustrated in FIGS. 3a and 3b. FIG. 3a represents the design shown in FIG. 1 where one of the opposing frontal faces of two adjacent module units (8) serves as the feed inlet while the face of the other module unit (8) serves as a product outlet, i.e. the channel between the two opposing frontal faces of the adjacent module units (8) is separated by an impermeable partition (9). Alternatively, the same module units (8) may be arranged as shown generally in FIG. 3b and in illustrated the specific design of FIG. 4 where two opposing frontal faces of adjacent module units (8) may simultaneously serve as feed inlets, each accepting one-half of the feed gas flow (or product gas flow) into the channel between the module units (8). Likewise, a single product channel is positioned between two adjacent module units (8). The shared channels between opposing frontal faces of adjacent module units (8) are positioned in an alternating arrangement of feed and product channels as illustrated in FIG. 4 which has a housing of radial configuration. Thus, as shown, a single feed channel provides flow to two module units (8) while a single product channel carries product from two module units (8). These two basic module unit arrangements, as shown in FIG. 3 and represented by the embodiments shown in FIGS. 1 and 4, provide many options for configuring the module units within a housing and for minimizing voids external to the module units.

A wide range of adsorbent materials can be used depending on the process employed and are well know in the art. Preferably, the adsorbent materials will be porous particulate materials such as molecular sieves. For air separation PSA processes, the adsorbent material is typically a zeolite molecular sieve materials as are known and commercially available. The adsorbent material used within the modular adsorbent bed unit can be composed of a single layer material or, in the case of air separation using nitrogen selective zeolites, a two layer material configuration is preferred, i.e., the first layer nearest the feed inlet removes water and $CO_2$ while the second layer serves as the nitrogen selective adsorbent material. However, there may be an increased number of layers, e.g., three or four, packed within the modular adsorbent bed unit, depending on the desired adsorption application and process design.

The adsorbent material may be packed particles or may be an adsorbent arrangement in the form of a monolithic adsorbent composition. The adsorbent material can also be coated onto thin plates in the form of honeycomb cellular structures with enough open area to allow sufficient gas flow.

Figure 5A:
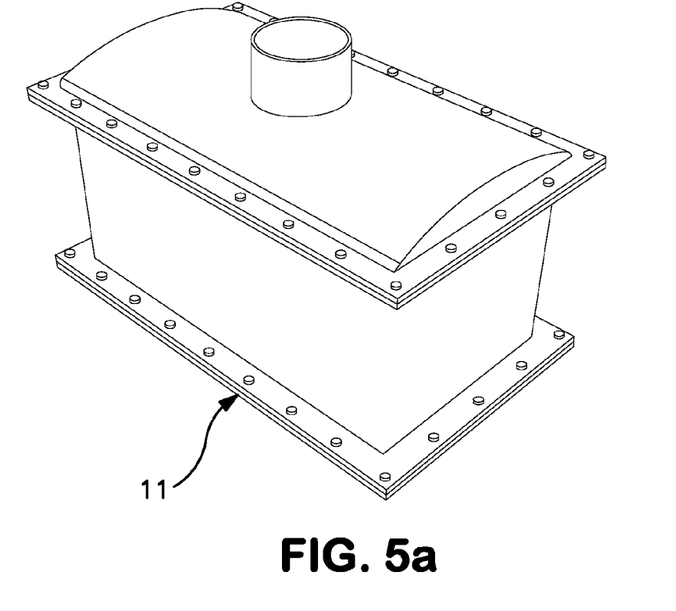
FIG. 5a is a schematic illustrating an isometric view and FIG. 5b is a sectional view of a housing for enclosing a plurality of modular compact adsorbent bed units of the present invention as shown in FIG. 1.
Figure 5B:
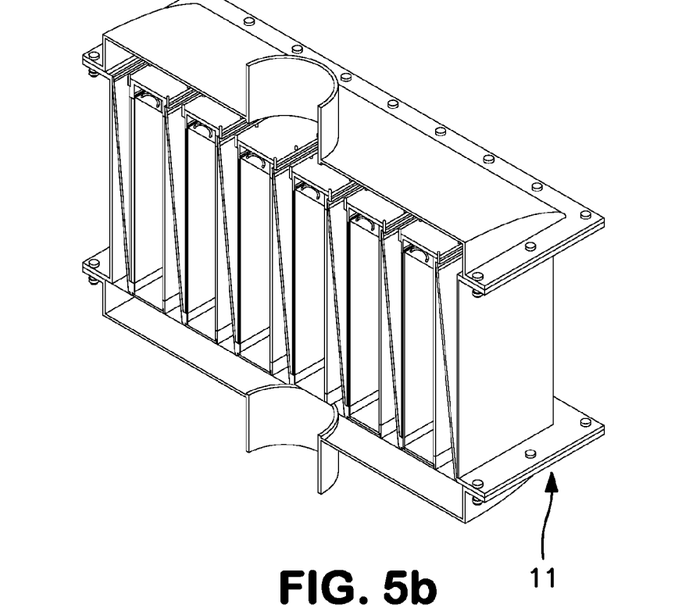

As shown in FIGS. 5a and 5b, the space within housing (11) is filled with modular adsorbent bed units, each modular unit having adsorbent material as selected for the particular process. Housing (11) is shown as a generally rectangular box with separate slotted openings to receive the modular units and will include a feed inlet, a feed manifold, a product manifold, and a product outlet. Alternatively, one or more separate assemblies can be designed to hold the modular units and related gas flow components (not shown) and which can be fabricated separately and inserted into housing (11) as a separate component. Referring again to FIG. 1, it is preferred that feed and product channels (6, 7) which are positioned on opposite sides of the modular adsorbent bed unit are symmetric and tapered in shape to aid in an even distribution of the gas to and from the modular adsorbent bed units. A taper angle is preferred as shown and will preferably be between 2° to 20°, and more preferably about 5°, wherein the size of the entrance of the feed channel (6) and size of exit of the product channel (7) are wider than the closed (opposite) end as shown in FIG. 1.

In the embodiment as shown, rectangular shaped housing (11) will be hermetically sealed so that gas flow in and out of the housing is limited to feed inlet (2) and product outlet (3). As is apparent to one skilled in the art, the outside walls of housing (11) and the means for sealing the walls must be designed to accept all structural stress forces created by the adsorption process. Housing (11) is not restricted to the rectangular shape as shown and the housing (11) and modular adsorbent bed units (8) can be of varying sizes and shapes.

The modular compact adsorbent bed units of this invention are designed and built to be self-contained, fully resistant to pressure and vacuum forces, and able to withstand the pressure and temperature variation of a gas separation process such as a pressure swing cyclic adsorption process. As described, the adsorbent material is densely packed and retained between the two parallel frontal faces which are porous and are typically constructed of perforated plates and wire mesh or cloth screens to allow gas flow in and out of the adsorbent material while containing the adsorbent material within the modular-unit. Varying structural containment means or packing constraints can be employed providing that the containment means used will securely retain the absorbent material in position and allow the process gases to flow through the bed. The potential for fluidization of the adsorbent material (in contrast to conventional beds) is eliminated by the combination of densely packing the bed and the fact that the bed is constrained on all sides within the modular unit. In addition, means for creating force on the adsorbent material, such as a spring-loaded plate or pressurized bladder (not shown), can be placed inside the modular adsorbent bed unit on the top or bottom of the adsorbent material layer and parallel the one of the side walls to apply continuous pressure to the adsorbent material and to maintain a well packed bed and prevent flow bypassing.

To improve the gas flow distribution, entrance into feed channel and exit from product channels, along with feed and product manifolds can be furnished with flow distributing devices such as baffles, guide vanes, screens, etc. Additionally, movable vanes could be added to the feed or/and product manifolds to control individual element flow rates if flow balancing is required.

One additional benefit of the present invention is the ability to modify the adsorbent bed structure for adsorption plants once in use with minimum effort and shut down time. Each modular adsorbent bed unit may be filled, installed or replaced in the field and new modular adsorbent bed units can be shipped already packed with adsorbent material and ready for installation.

EXAMPLE

An adsorption bed structure containing a plurality of modular adsorbent beds units as shown in FIG. 1 was designed and compared to a conventional bed capable of producing the same amount of gas product. Each of the modular adsorbent bed units (8) were designed as flat rectangular boxes 1.0 m×1.0 m (3.5 ft×3.5 ft) square frontal bed area and 0.2 m (8.0 in) bed length as shown in FIG. 2. The volume within each unit was filled with adsorbent material, and gas flow entered into and exited out of this adsorbent material through the opposing two largest faces. There is no gas flow into or out of this unit through the other four surfaces. Feed and product channels (6, 7) on both sides of the adsorbent material were symmetric and tapered in shape, with a 5° taper angle. Each feed and product channel was wider near the entrance or exit end and thinner at the closed end.

There are six modular adsorbent bed units, as shown in FIG. 1, with identical dimensions to provide the desired product throughput. To provide enough room for feed and product channels, the spacing between adsorbent bed units was approximately 0.13 m (5.0 in). All of these adsorbent bed units are placed into a rectangular housing having dimensions of 1.0 m×1.0 m×2.0 m 3.5 ft×3.5 ft×6.5 ft) as shown in FIGS. 5a and 5b.

The specified bed unit configurations provide increased bed frontal area and decreased bed depth. This bed configuration is capable of handling approximately 9500 scfm of air to produce 15 TPD oxygen using approximately 907 kg (2000 lb) of commercially available LiX zeolite adsorbent. The amount of the same adsorbent material to produce 15 TPD oxygen using a conventional adsorption bed is about 3,400 kg (7,500 lb) or more, requiring a 3.35 m (11 ft) diameter vessel. Savings on adsorbent material inventory, plant footprint, skid and equipment dimensions are clearly shown with this comparative example.

The present invention includes adsorbent beds structures that can be employed in various adsorption processes including simultaneous adsorption cycles (single-feed), or cycles that are out of phase (multi-feed). A plurality of modular adsorbent bed units can be used with multiple adsorbent bed structures in processes such as single-bed, two-bed, three-bed, or multi-bed process modes. The capacity of the adsorbent bed structure can be varied through the adjustment of any or all of the adsorbent bed unit's height and width and the number of modular units installed within the adsorbent bed structure. In practice, each conventional adsorbent bed or vessel in a gas separation system can be replaced with a modular adsorbent bed structure of this invention It should be apparent to those skilled in the art that the subject invention is not limited by the examples provided herein which have been provided to merely demonstrate the operability of the present invention. The scope of this invention includes equivalent embodiments, modifications, and variations that fall within the scope of the attached claims.

What is claimed is:

1. A adsorption bed structure used in cyclic adsorption processes comprised of:
    a) an enclosed housing with inlet means and outlet means,
    b) a plurality of a modular compact adsorbent bed units within the housing, each of the units comprised of two substantially parallel opposing gas permeable faces enclosed within perimeter side walls connected to the faces and wherein the distance between the modular adsorbent bed units is equal to or less than half of the modular adsorbent bed unit depth,
    c) adsorbent material densely packed within the units and having an inter-particle void fraction of less than 40%,
    d) a feed channel adjacent to one face of each of the units;
    e) a product channel adjacent to the opposing face of each of the units; and
        wherein a product gas flows into the housing through the inlet means through the adsorbent bed units and exits the adsorbent bed units through the product channel to the outlet means, and
        wherein the distance between the adsorbent bed units containing the feed channel and the product channels is equal to or less than half of the bed depth and the void volume ratio of the bed is less than 30%.

2. The structure of claim 1 wherein the feed channel is tapered, having a wider end where the gas enters the feed channel, and the product channel is tapered, having a wider end where the gas exits the product channel, and wherein the feed channel and the product channel are symmetric.

3. The structure of claim 1 wherein the product channel is narrower than the feed channel.

4. The structure of claim 2 wherein the product channel is narrower than the feed channel.

5. The structure of claim 1 wherein the surface area of one face is greater than the total area of the side walls.

6. The structure of claim 1 wherein the volume of outlet means is less than 25 percent of the volume of the inlet means.

7. The structure of claim 1 wherein the distance between the adsorbent bed units is one half of the bed depth or less.

8. An adsorption bed structure for use in an adsorption-based gas separation process comprised of:
   a) a box shaped adsorbent bed housing having a feed inlet on one side of the housing and a product outlet on the opposing side of the housing and having a plurality of receiving slots positioned within the housing in substantially parallel sequence;
   b) a plurality of modular adsorbent bed units within the receiving slots, each modular adsorbent bed unit comprised of two parallel opposing gas permeable faces enclosed within perpendicularly positioned non-gas permeable side walls sealing the perimeter of the faces; and
   c) an adsorbent material densely packed within the faces and the side walls;
   wherein the feed inlet leads to a feed manifold in communication with feed flow channels proximate to one face of the modular adsorbent bed units and a product flow channel in communication with the product manifold proximate to the other face of the modular adsorbent bed units and the product manifold leads to the product outlet, and
   wherein the adsorbent bed structure has a total void volume ratio of less than 30%.

9. The adsorbent bed structure of claim 8 wherein a channel dividing wall is positioned between the feed channels and the product channels.

10. The adsorbent bed structure of claim 9 wherein a channel dividing wall is positioned between the modular adsorbent bed units creating the feed channel on one side of the channel dividing wall and the product channel on the other side of the channel dividing wall.

11. The adsorbent bed structure of claim 10 wherein the feed channel is tapered, having a wider end where the gas enters the feed channel, and the product channel is tapered, having a wider end where the gas exits the product channel, and wherein the feed channel and the product channel are symmetric.

12. The adsorbent bed structure of claim 8 wherein and the frontal area of each face of each of the modular units is greater than the total area of the side walls.

13. The adsorbent bed structure of claim 8 used in a cyclic PSA, VSA or VPSA process.

14. A cyclic adsorption-based gas separation process for removing at least one absorbable gas component from a multi-component feed gas comprising passing the feed gas through an adsorbent bed structure comprising:
   a) a plurality of modular compact adsorbent bed units, each modular unit having two opposing gas permeable faces enclosed within four non-permeable side walls around the perimeter of the faces,
   b) adsorbent material densely packed and having an inter-particle void fraction of less than 40% retained within the faces and the side walls,
   c) feed channels proximate to one face of modular adsorbent bed unit and a product channel proximate to the opposing face of the same modular adsorbent bed unit,
   d) a housing having a feed inlet to receive feed gas, a feed manifold to distribute the feed gas to the product channel and a product manifold and a product outlet to receive the product gas from the product channel, and
   wherein the housing encloses the plurality of modular adsorbent units, the feed channel, the product channel, the inlet manifold and the product manifold and the total void volume ratio is less than 30%.

15. The gas separation process of claim 14 wherein the modular adsorbent bed units are positioned in substantially parallel sequence and the feed gas moves axially through each of the modular adsorbent bed units.

16. The process of claim 15 wherein the distance between the adsorbent bed units is one half of the bed depth or less.

17. The gas separation process of claim 14 wherein the process is a PSA, VSA, or VPSA process operating at a fast cycle.

18. The gas separation process of claim 17 wherein the process is the separation of air to produce oxygen.

19. The gas separation process of claim 14 with a cycle time is less than 30 seconds.

20. An adsorption bed structure for use in a cyclic adsorption-based gas separation process comprising:
   a) a plurality of modular compact adsorbent bed units spaced apart from and located generally parallel to one another;
   b) each of the modular adsorbent bed units having two opposed faces in which process streams are introduced into and discharged from the units when the adsorption bed structure is subjected to an cyclic adsorption process;
   c) a plurality of flow channels comprising a first set of flow channels, each in communication with one of the two opposed faces of each of the modular adsorbent bed units and a second set of channels each in communication with the opposite side of the two opposed faces of each of the modular adsorbent bed units such that the first set of flow channels introduce process gas streams into the modular adsorbent bed units on one side of the two opposed faces and the second set of flow channels collect the process gas streams from the opposed face of the two opposed faces of the modular adsorbent bed units and wherein the distance between two adsorbent beds units is equal to or less then the distance of the bed length;
   d) the plurality of flow channels and the modular adsorbent bed units aligned in serial arrangement such that the plurality of flow channels are located between the modular adsorbent bed units and at opposite ends of the serial arrangement; and
   e) first and second manifolds in communication with the first set of flow channels and the second set of flow channels, respectively, to introduce the gas process streams into the first set of flow channels and withdraw the process gas streams from and the second set of flow channels on opposing sides of the modular adsorbent bed units;
   wherein the first set of flow channels are tapered, having a wider end where the gas enters the first set of channels, and the second set of flow channels are tapered, having a wider end where the gas exits the second set of channels, and wherein the first and second set of flow channels are symmetric.

21. The adsorbent bed structure of claim 20, wherein the system further comprises void spaces and the void spaces contain inert filler material.

22. The adsorbent bed structure of claim 20, wherein there are at least two adsorbent bed units and the system further comprises a separator between the feed channels and the product channels.

23. The adsorbent bed structure of claim 20, wherein the opposing faces of the at least one adsorbent bed are perforated plates with mesh wire or cloth screens.

24. An adsorption bed structure for use in a cyclic adsorption-based gas separation process comprising:
   a) a plurality of modular compact adsorbent bed units spaced apart from and located generally parallel to one another;
   b) each of the modular adsorbent bed units having two opposed faces in which process streams are introduced into and discharged from the units when the adsorption bed structure is subjected to an cyclic adsorption process;
   c) a plurality of flow channels comprising a first set of flow channels, each in communication with one of the two opposed faces of each of the modular adsorbent bed units and a second set of channels each in communication with the opposite side of the two opposed faces of each of the modular adsorbent bed units such that the first set of flow channels introduce process gas streams into the modular adsorbent bed units on one side of the two opposed faces and the second set of flow channels collect the process gas streams from the opposed face of the two opposed faces of the modular adsorbent bed units and wherein the distance between two adsorbent beds units is equal to or less then the distance of the bed length;
   d) the plurality of flow channels and the modular adsorbent bed units aligned in serial arrangement such that the plurality of flow channels are located between the modular adsorbent bed units and at opposite ends of the serial arrangement; and
   e) first and second manifolds in communication with the first set of flow channels and the second set of flow channels, respectively, to introduce the gas process streams into the first set of flow channels and withdraw the process gas streams from and the second set of flow channels on opposing sides of the modular adsorbent bed units; and
wherein the second set of flow channels are narrower than the first set of feed channels.

\* \* \* \* \*